United States Patent
Bobbitt et al.

(10) Patent No.: US 9,946,951 B2
(45) Date of Patent: Apr. 17, 2018

(54) SELF-OPTIMIZED OBJECT DETECTION USING ONLINE DETECTOR SELECTION

(71) Applicant: International Business Machines Corporation, Armonk, NY (US)

(72) Inventors: Russell P. Bobbitt, New York, NY (US); Rogerio S. Feris, Hartford, CT (US); Chiao-Fe Shu, Scarsdale, NY (US); Yun Zhai, Pound Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 425 days.

(21) Appl. No.: 14/824,341

(22) Filed: Aug. 12, 2015

(65) Prior Publication Data

US 2017/0046596 A1 Feb. 16, 2017

(51) Int. Cl.
*G06K 9/46* (2006.01)
*G06K 9/00* (2006.01)
(Continued)

(52) U.S. Cl.
CPC .......... *G06K 9/46* (2013.01); *G06K 9/00771* (2013.01); *G06K 9/626* (2013.01); *H04N 7/181* (2013.01);
(Continued)

(58) Field of Classification Search
CPC ....... G06K 9/00771; G06K 2009/3291; G06K 2009/4666; G06K 2209/27; G06K 9/46;
(Continued)

(56) References Cited

U.S. PATENT DOCUMENTS 8,582,816 B2   6/2013   Lee et al.
8,855,361 B2  10/2014   Millar et al.
(Continued)

FOREIGN PATENT DOCUMENTS

WO   2009143542 A2   12/2009
WO   2012022744 A2    2/2012
WO   2013074060 A1    5/2013

OTHER PUBLICATIONS

List of IBM Patents or Patent Applications Treated as Related; Date Filed: Aug. 12, 2015, 2 pages.
(Continued)

*Primary Examiner* — Anner N Holder
(74) *Attorney, Agent, or Firm* — Cantor Colburn LLP

(57) ABSTRACT

Embodiments are directed to an object detection system having at least one processor circuit configured to receive a series of image regions and apply to each image region in the series a detector, which is configured to determine a presence of a predetermined object in the image region. The object detection system performs a method of selecting and applying the detector from among a plurality of foreground detectors and a plurality of background detectors in a repeated pattern that includes sequentially selecting a selected one of the plurality of foreground detectors; sequentially applying the selected one of the plurality of foreground detectors to one of the series of image regions until all of the plurality of foreground detectors have been applied; selecting a selected one of the plurality of background detectors; and applying the selected one of the plurality of background detectors to one of the series of image regions.

11 Claims, 8 Drawing Sheets

(51) Int. Cl.
*G06K 9/62* (2006.01)
*H04N 7/18* (2006.01)

(52) U.S. Cl.
CPC . *G06K 2009/4666* (2013.01); *G06K 2209/27* (2013.01)

(58) Field of Classification Search
CPC .... G06K 9/6217; G06K 9/626; G06K 9/6262; G06K 9/6263; H04N 7/181; G06T 7/2046
See application file for complete search history.

(56) References Cited

U.S. PATENT DOCUMENTS

| | | | | |
|---|---|---|---|---|
| 9,454,819 | B1* | 9/2016 | Seetharaman | G06T 7/0042 |
| 2006/0028552 | A1* | 2/2006 | Aggarwal | G01S 3/7864 |
| | | | | 348/169 |
| 2008/0069400 | A1* | 3/2008 | Zhu | G06K 9/3241 |
| | | | | 382/103 |
| 2010/0135528 | A1* | 6/2010 | Bobbitt | G06K 9/00342 |
| | | | | 382/103 |
| 2010/0215256 | A1* | 8/2010 | Wang | G06K 9/34 |
| | | | | 382/159 |
| 2010/0296698 | A1* | 11/2010 | Lien | G06T 7/20 |
| | | | | 382/103 |
| 2011/0090344 | A1* | 4/2011 | Gefen | H04N 5/232 |
| | | | | 348/169 |
| 2012/0106849 | A1* | 5/2012 | Tojo | G06L 7/0081 |
| | | | | 382/195 |
| 2012/0170805 | A1* | 7/2012 | Brown | G06K 9/00778 |
| | | | | 382/103 |
| 2012/0288198 | A1* | 11/2012 | Tojo | G06K 9/00771 |
| | | | | 382/173 |
| 2013/0002863 | A1 | 1/2013 | Jia et al. | |
| 2013/0243331 | A1* | 9/2013 | Noda | G06K 9/6203 |
| | | | | 382/195 |
| 2013/0336581 | A1* | 12/2013 | Datta | G06K 9/00785 |
| | | | | 382/165 |
| 2014/0003708 | A1* | 1/2014 | Datta | G06K 9/6256 |
| | | | | 382/159 |
| 2014/0056479 | A1 | 2/2014 | Bobbitt et al. | |
| 2014/0169663 | A1* | 6/2014 | Han | G06K 9/00724 |
| | | | | 382/159 |
| 2017/0046587 | A1 | 2/2017 | Bobbitt et al. | |

OTHER PUBLICATIONS

Jiang et al., "Towards optimal bag-of-features for object categorization and semantic video retrieval." In Proceedings of the 6th ACM international conference on Image and video retrieval, pp. 494-501. ACM, 2007.

Leibe et al., "Coupled object detection and tracking from static cameras and moving vehicles." Pattern Analysis and Machine Intelligence, IEEE Transactions on 30, No. 10 (2008): 1683-1698.

* cited by examiner

SELF-OPTIMIZED OBJECT DETECTION USING ONLINE DETECTOR SELECTION

BACKGROUND

The present disclosure relates in general to image detection and/or recognition. More specifically, the present disclosure relates to systems and methodologies for reliably and continuously detecting objects in a continuous surveillance video system across significantly varying conditions, such as weather conditions and time of day.

Intelligent Video Analytics (IVA) describes a class of surveillance video systems that focuses on automating video analysis and security alerts, thus reducing the need for most manual monitoring and its associated inefficiencies and costs. A typical IVA system includes digital video technology integrated with analytical software. The video analytics software may run on a networked device, such as a sophisticated IP (internet protocol) camera, in an embedded system or on a computer-based computing device. In a networked configuration, the IP camera records video footage and the resulting content is distributed over an IP network.

Visual object detection is a key component of IVA systems. In the past decade, significant progress has been made in the area of visual object detection. However, many challenges remain to be addressed in order to develop reliable detectors (i.e., classifiers) that run continuously over extended periods of time and under varying operating conditions. For example, certain environments, such as urban settings, present unique challenges due to significant object appearance variations caused by lighting effects such as shadows and specular reflections, object pose variation, multiple weather conditions, and different times of the day (e.g., day and night).

SUMMARY

Embodiments are directed to an object detection system having at least one processor circuit configured to receive a series of image regions and apply to each image region in the series a detector, which is configured to determine a presence of a predetermined object in the image region. The object detection system performs a method of selecting and applying the detector from among a plurality of foreground detectors and a plurality of background detectors in a repeated pattern that includes sequentially selecting a selected one of the plurality of foreground detectors; sequentially applying the selected one of the plurality of foreground detectors to one of the series of image regions until all of the plurality of foreground detectors have been applied; selecting a selected one of the plurality of background detectors; and applying the selected one of the plurality of background detectors to one of the series of image regions.

Embodiments are further directed to an object detection system having at least one processor circuit configured to receive a series of image regions and apply to each image region in the series a detector, which is configured to determine a presence of a predetermined object in the image region. The object detection system includes the at least one processor circuit configured to select and apply the detector from among a plurality of foreground detectors and a plurality of background detectors in a repeated pattern. The repeated pattern includes sequentially selecting a selected one of the plurality of foreground detectors; sequentially applying the selected one of the plurality of foreground detectors to one of the series of image regions until all of the plurality of foreground detectors have been applied; selecting a selected one of the plurality of background detectors; and applying the selected one of the plurality of background detectors to one of the series of image regions.

Embodiments are further directed to computer program product controlling an objection detection system having at least one processor circuit configured to receive a series of image regions and apply to each image region in the series a detector, which is configured to determine a presence of a predetermined object in the image region. The computer program product includes a computer readable storage medium having program instructions embodied therewith, wherein the computer readable storage medium is not a transitory signal per se. The program instructions are readable by the at least one processor circuit to cause the at least one processor circuit to perform a method. The method includes selecting and applying the detector from among a plurality of foreground detectors and a plurality of background detectors in a repeated pattern. The repeated pattern includes sequentially selecting a selected one of the plurality of foreground detectors; sequentially applying the selected one of the plurality of foreground detectors to one of the series of image regions until all of the plurality of foreground detectors have been applied; selecting a selected one of the plurality of background detectors; and applying the selected one of the plurality of background detectors to one of the series of image regions.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

Figure 1:
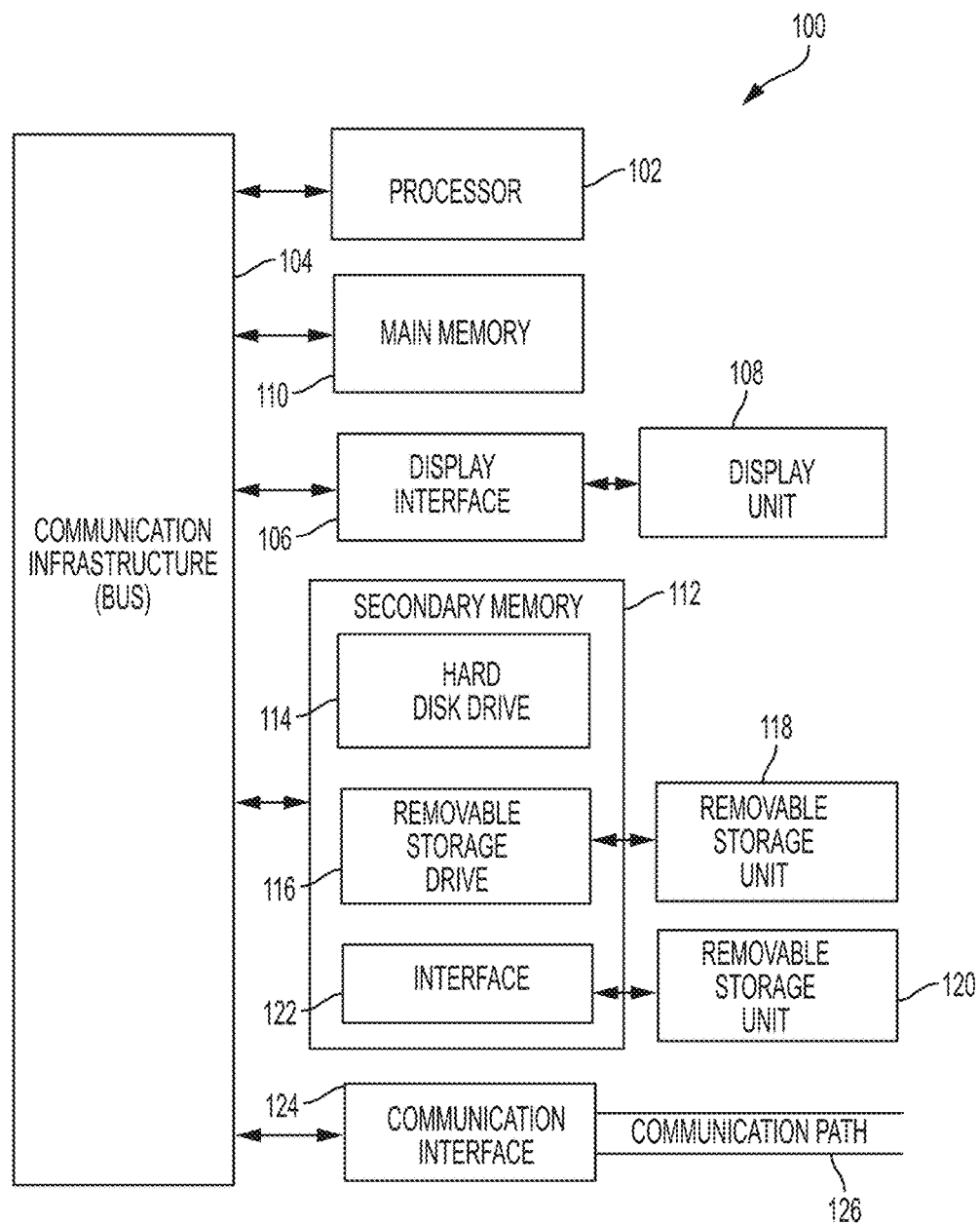
FIG. 1 depicts a high level block diagram showing an example of a computer-based information processing system useful for implementing one or more embodiments.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. It is noted that various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Additionally, although one or more embodiments are disclosed herein in connection with traffic monitoring and vehicle detection application domains, the teachings of the present disclosure are not limited to traffic monitoring, vehicle detection environments, and may be applied to other object detection environments, now known or later developed.

As previously noted herein, WA systems are a class of surveillance video systems that focuses on automating video analysis and security alerts, thus reducing the need for most manual monitoring and its associated inefficiencies and costs. A typical IVA system includes digital video technology integrated with analytical software. The video analytics software may run on a networked device, such as a sophisticated IP (internet protocol) camera, in an embedded system or on a computer-based computing device. In a networked configuration, the IP camera records video footage and the resulting content is distributed over an IP network. An exemplary IVA system is IBM's Intelligent Video Analytics system, which identifies events, attributes or patterns of behavior through video analysis of monitored environments. The video analysis software of the system monitors video streams in near real-time, automatically generates alerts, and facilitates forensic analysis of historical data to identify specific incidents, trends and patterns.

Visual object detection is a central component of IVA systems. In the past decade, significant progress has been made in the area of visual object detection. However, many challenges remain to be addressed in order to develop reliable detectors that run continuously over extended periods of time and under varying operating conditions. For example, certain environments such as urban settings present unique challenges due to significant object appearance variations caused by lighting effects such as shadows and specular reflections, object pose variation, multiple weather conditions, and different times of the day (e.g., day and night).

A typical commercial IVA system relies on background modeling techniques for detecting moving blobs as a proxy for objects in the scene. These blob-based approaches are efficient and work reasonably well in low-activity scenarios. However, they are limited in their ability to handle typical urban conditions such as crowded scenes, where multiple objects are frequently merged into a single motion blob, compromising higher-level tasks such as object classification and extraction of attributes. A more recent development is object-centered IVA architectures, which rely on appearance-based object detectors (e.g., pedestrian and vehicle detectors) and have proven quite effective in replacing or complementing blob-based approaches.

Despite the extensive evaluation benchmarks and significant progress made in the field, existing off-the-shelf detectors still face significant challenges when deployed in continuous (e.g., 24 hours per day, 7 days per week) surveillance systems due to the wide range of appearance variations. As an example, the appearance of objects such as vehicles dramatically changes from daylight to night-time. Multiple weather conditions (rain, snow . . . ), and lighting effects such as shadows and specular reflections also cause serious issues. Different camera placements and object pose variations are yet another source of dramatic changes in object appearance. Online adaptation methods have been proposed to automatically adapt a generic detector to different scenarios, but either requires a few labeled samples from the target domain or, in the case of unsupervised adaptation, are sensitive to drifting. In addition, training a generic detector to handle a wide range of appearance variations under a wide range of environmental conditions is difficult due to complex non-linear variations in the training set (e.g., noise and drifting) and the large computational load that would be required.

Turning now to an overview of the present disclosure, one or more embodiments provide object detection systems and methodologies for reliably and continuously detecting objects in a continuous surveillance video system (e.g., IVA) across significantly varying conditions, such as weather conditions and time of day. Rather than training a generic detector and attempting to adapt its parameters to a wide range of conditions, which is computationally expensive and sensitive to drifting, the present disclosure instead creates a set of efficient detector models that cover multiple and potentially overlapping appearance subspaces. At run time, one or more embodiments continuously select the most suitable detectors for a given scene and environmental condition(s). The suitability of a detector is measured or weighted based at least in part on an evaluation of each detector's calibrated confidence score, which is updated over time. The present disclosure classifies each detector as a foreground detector or a background detector based at least in part on each detector's confidence score being above or below a predetermined threshold. Thus, the term background as used herein identifies a particular class of detectors and is not a reference to the scene background. Foreground detectors, which have been determined by their confidence scores to be suitable to the current environmental condition(s), are run frequently across the video sequence. Background detectors, which have been determined by their confidence scores to not be suitable to the current environment condition(s), are run sporadically across the video sequence.

Because confidence scores are updated over time, and because both foreground and background detectors are continuously applied, the present disclosure re-classifies a given background detector as a foreground detector if the given background detector's updated confidence score exceeds the predetermined threshold. Likewise, the present disclosure re-classifies a given foreground detector as a background detector if the given foreground detector's updated confidence score falls below the predetermined threshold. Accordingly, the present disclosure dynamically selects and applies the detector(s) most appropriate for a given scene and environmental condition(s).

Turning now to a more detailed description of the present disclosure, FIG. 1 depicts a high level block diagram showing an example of a computer-based information processing system 100 useful for implementing one or more embodiments of the present disclosure. Although one exemplary computer system 100 is shown, computer system 100 includes a communication path 126, which connects computer system 100 to additional systems (not depicted) and may include one or more wide area networks (WANs) and/or local area networks (LANs) such as the Internet, intranet(s), and/or wireless communication network(s). Computer system 100 and additional system are in communication via communication path 126, e.g., to communicate data between them.

Computer system 100 includes one or more processors, such as processor 102. Processor 102 is connected to a communication infrastructure 104 (e.g., a communications bus, cross-over bar, or network). Computer system 100 can include a display interface 106 that forwards graphics, text, and other data from communication infrastructure 104 (or from a frame buffer not shown) for display on a display unit 108. Computer system 100 also includes a main memory 110, preferably random access memory (RAM), and may also include a secondary memory 112. Secondary memory 112 may include, for example, a hard disk drive 114 and/or a removable storage drive 116, representing, for example, a floppy disk drive, a magnetic tape drive, or an optical disk drive. Removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, removable storage unit 118 includes a computer readable medium having stored therein computer software and/or data.

In alternative embodiments, secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to computer system 100.

Computer system 100 may also include a communications interface 124. Communications interface 124 allows software and data to be transferred between the computer system and external devices. Examples of communications interface 124 may include a modem, a network interface (such as an Ethernet card), a communications port, or a PCM-CIA slot and card, etcetera. Software and data transferred via communications interface 124 are in the form of signals which may be, for example, electronic, electromagnetic, optical, or other signals capable of being received by communications interface 124. These signals are provided to communications interface 124 via communication path (i.e., channel) 126. Communication path 126 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 110 and secondary memory 112, removable storage drive 116, and a hard disk installed in hard disk drive 114. Computer programs (also called computer control logic) are stored in main memory 110 and/or secondary memory 112. Computer programs may also be received via communications interface 124. Such computer programs, when run, enable the computer system to perform the features of the present disclosure as discussed herein. In particular, the computer programs, when run, enable processor 102 to perform the features of the computer system. Accordingly, such computer programs represent controllers of the computer system.

Figure 2:
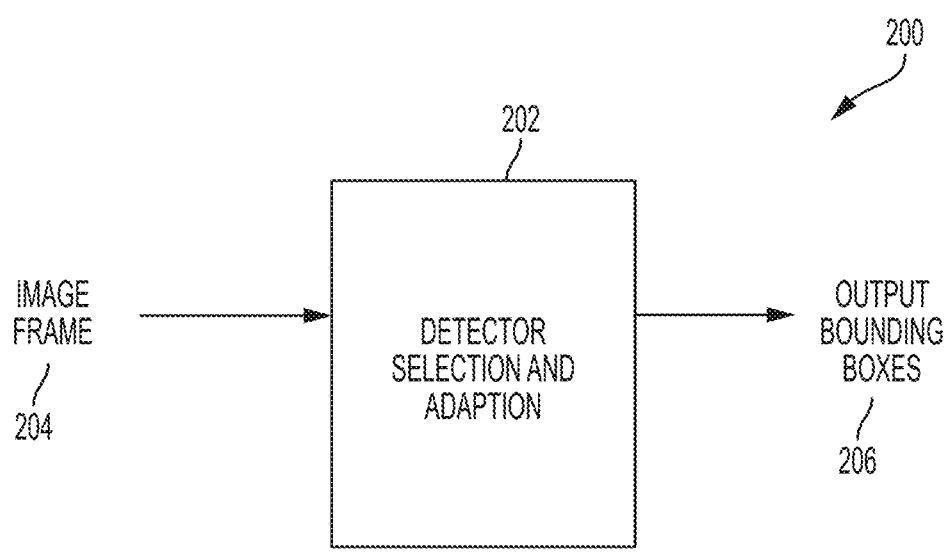
FIG. 2 depicts a diagram illustrating a detector selection and adaption system according to one or more embodiments.

FIG. 2 depicts a diagram illustrating a detector selection and adaption system 200 according to one or more embodiments. As shown, system 200 includes a detector selection and adaption (DSA) circuit/module 202 that receives an image frame 204 as an input, and generates an output bounding box 206 that may be applied to image frame 204 to surround and identify the predetermined object in image frame 204. As described and illustrated in greater detail herein below, DSA module 202 creates a set of efficient detector models that cover multiple and potentially overlapping appearance subspaces. At run time, DSA module 202 continuously selects the most suitable detectors for a given scene and environmental condition(s). The suitability of a detector is measured or weighted based at least in part on an evaluation of each detector's calibrated confidence score, which is updated over time. DSA module 202 classifies each detector as a foreground detector or a background detector based at least in part on each detector's weight (i.e., confidence score) being above or below a predetermined threshold. Foreground detectors, which have been determined by their confidence scores to be suitable to the current environmental condition(s), are run frequently across the video sequence. Background detectors, which have been determined by their confidence scores to not be suitable to the current environment condition(s), are run sporadically across the video sequence.

Because confidence scores are updated over time, and because both foreground and background detectors are continuously applied, DSA module 202 utilizes the updated confidence scores to reclassify a given background detector as a foreground detector if the given background detector's updated confidence score exceeds the predetermined threshold. Likewise, DSA module 202 re-classifies a given foreground detector as a background detector if the given foreground detector's updated confidence score falls below a predetermined threshold. Accordingly, DSA module 202 dynamically selects and applies the detector(s) most appropriate for a given scene and environmental condition(s).

Figure 3:
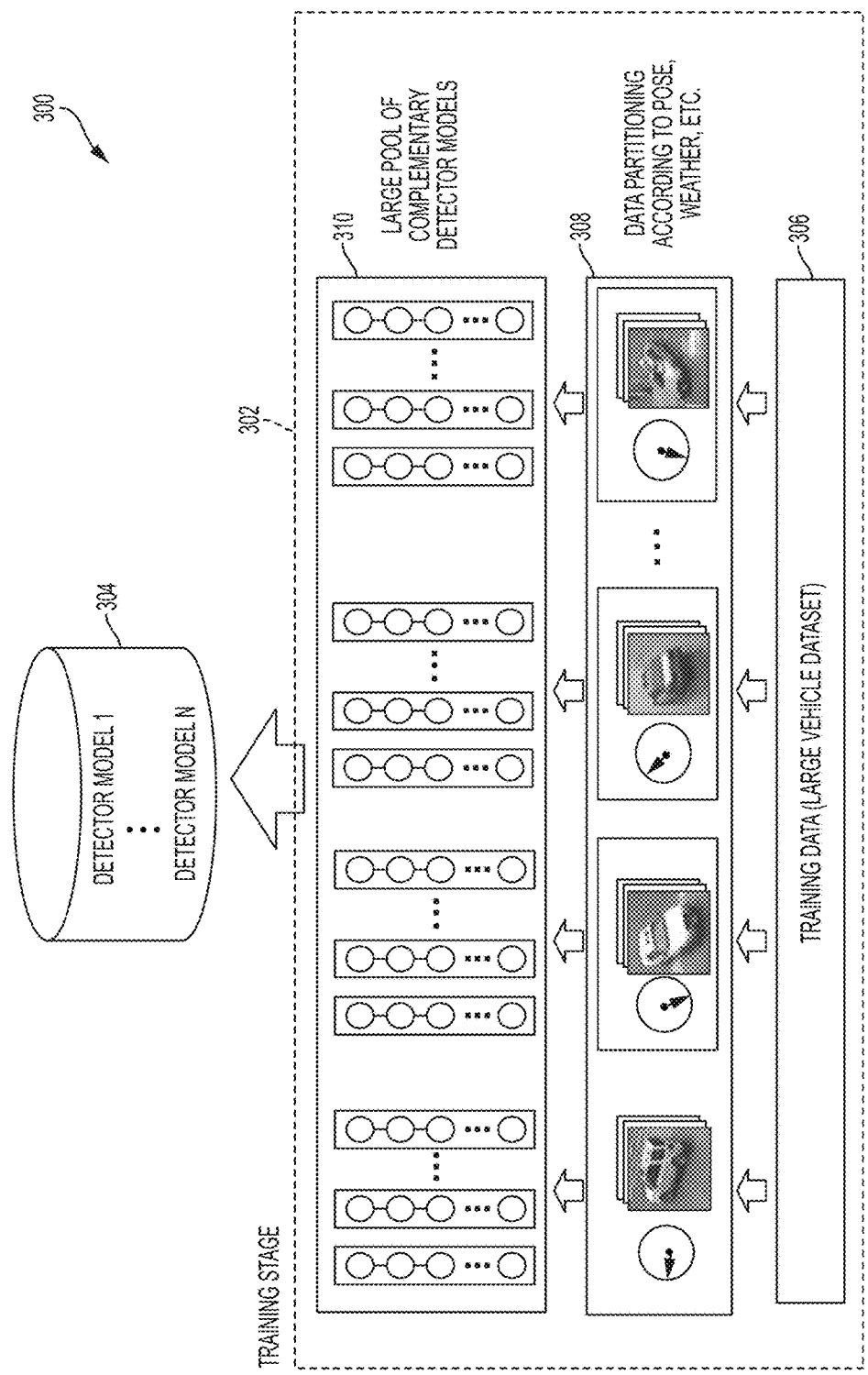
FIG. 3 depicts a diagram illustrating a training module for developing a portfolio of complementary cascaded detector models according to one or more embodiments.

FIG. 3 depicts a diagram illustrating an example of a training module 300 for developing a portfolio of complementary detector models according to one or more embodiments. The actual manner in which detector modules are trained is known in the art. According to one or more embodiments of the present disclosure, known detector module training systems are used to develop detector models that are extremely efficient and complementary in that each model is focused on detecting a predetermined object under a particular set of environmental conditions. For example, one detector model may be designed to detect an automobile at night when it is raining. Another detector model may be designed to detect an automobile during daylight hours on an overcast and rainy day. Still another detector model may be designed to detect an automobile during daylight hours on a bright, sunny day with no precipitation. In some instances, the target environment conditions of one detector model may overlap the target environment conditions of another detector model. Detector models continue to be developed until a desired range of environmental conditions and a desired level of overlap between the covered environmental conditions are achieved.

As shown in FIG. 3, training module 300 includes a training stage 302 and a detector model portfolio 304. Training stage 302 includes a training data set 306, a data partitioning module 308 and a complementary detector models pool 310, configured and arranged as shown. The operation of training module 300 will now be described with reference to a particular example. Training data set 306 may be developed by capturing a large set of vehicle images from approximately 30 surveillance cameras without significant annotation cost. Accordingly, training dataset 306 may contain, for example, approximately one million images, covering many different weather conditions and times of day, and a wide variety of vehicle poses. Data partitioning module 308 partitions the data set into motionlet clusters, i.e., clusters containing vehicles with similar motion direction, which is automatically computed using optical flow. There is a strong correlation between these clusters and the pose of vehicles. Optionally, in order to obtain better performance in crowded scenes, which often depict vehicles with partial occlusions, training stage 302 may augment this data with synthetic occlusions, using an approach wherein Poisson image editing is used to synthesize vehicles occluding other vehicles.

For each motionlet cluster, the data is further subdivided data based on attributes such as daylight, night-time and weather conditions to develop/train pool 310 containing trained complementary detectors covering multiple appearance subspaces. The detectors of pool 310 are based on cascades of so-called "gentleboost" classifiers/detectors using Haar-like features from multiple channels. Detector models of portfolio 304 are extracted from pool 310. The detector models are extremely efficient because they are trained on relatively small subsets of the data with small ranges of pose variation, requiring much less discriminative features compared to generic detectors/classifiers, which are trained with data covering the full spectrum of appearance variations. The detector models cover multiple poses, lighting, and weather conditions. The range of poses and appearances may be overlapped for each cluster, in order to ensure a smooth transition during the selection and adaptation process, as described herein below. After the detector models are trained, an important step, as described in greater detail below, is to learn a function that maps their raw scores to calibrated probabilities, which are used as part of the selection and adaptation process. Isotonic regression may be used for this task, relying on a small validation set. The present disclosure is extensible in that any other off-the-shelf detector/classier could be added to pool 310 as long as they output calibrated probabilities.

Figure 4:
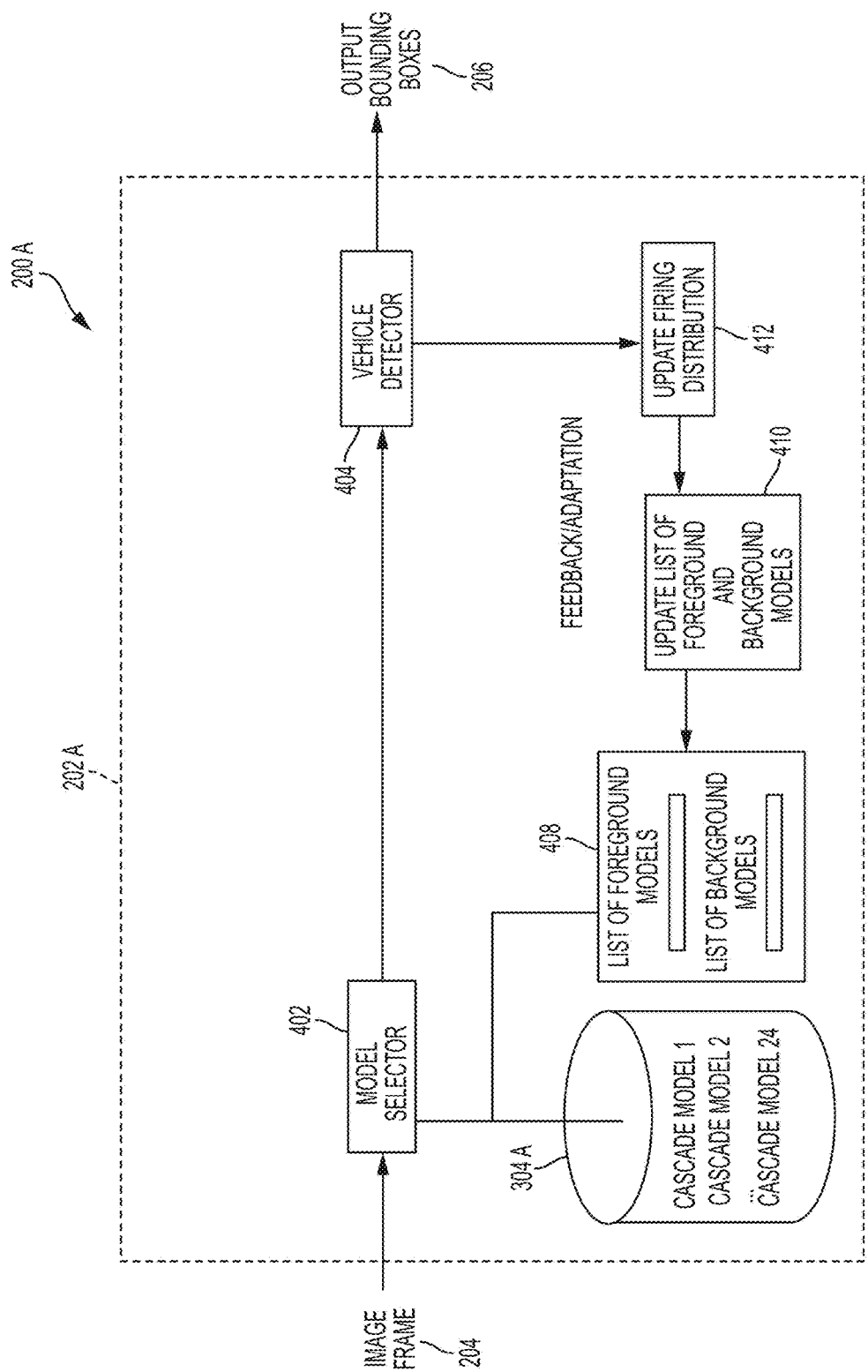
FIG. 4 depicts a more detailed illustration of the detector selection and adaption module shown in FIG. 2 according to one or more embodiments.

FIG. 4 depicts a diagram illustrating a detector selection and adaption system 200A having a DSA module 202A that is a more detailed example of DSA module 202 (shown in FIG. 2) according to one or more embodiments. DSA module 202A includes a model selector operation 402, a vehicle detector, 404, a detector module portfolio 304A, a foreground/background model list 408, an update foreground/background operation 410 and an update firing distribution operation 412, configured and arranged as shown. Model selector operation 402 selects from among portfolio 304A the cascade detector model that will be applied as vehicle detector 404.

Information related to whether vehicle detector 404 fired (i.e., detected an object) is fed to update firing distribution operation 412, which updates the firing distribution of the detectors (i.e., the weights of the detectors). Operation 410 uses the updated firing distribution to update foreground/background models list 408. Detector models in portfolio 304A having a weight above a predetermined threshold are classified as foreground detectors. Detector models in portfolio 304A having weight below a predetermined threshold are classified as background detectors. Although many detector models are provided in portfolio 304A, model selector operation 402 selects only one to run in each image frame 204 during testing time. Model selector operation 402 runs foreground detectors more frequently than background detectors, and the list of foreground and background detectors is adaptively changed depending on the camera and the scene.

All detectors in pool 304A are continuously classified as either foreground or background by thresholding a time-varying weight distribution based on the detector calibrated scores. Initially, during the system start-up, all detector models in pool 304A are initialized as background detectors. The detector selection is interleaved across the video sequence by running detector $D_k$ at frame t, where k=t mod N, and N is the total number of detectors in the pool. In other words, only one detector is run per image frame in a round-robin fashion. Each detector $D_k$ has an associated weight $w_{k,t}$ which indicates its suitability to the input video at time t. Initially the weights of all detectors are equal and set to 1/N.

Figure 6:
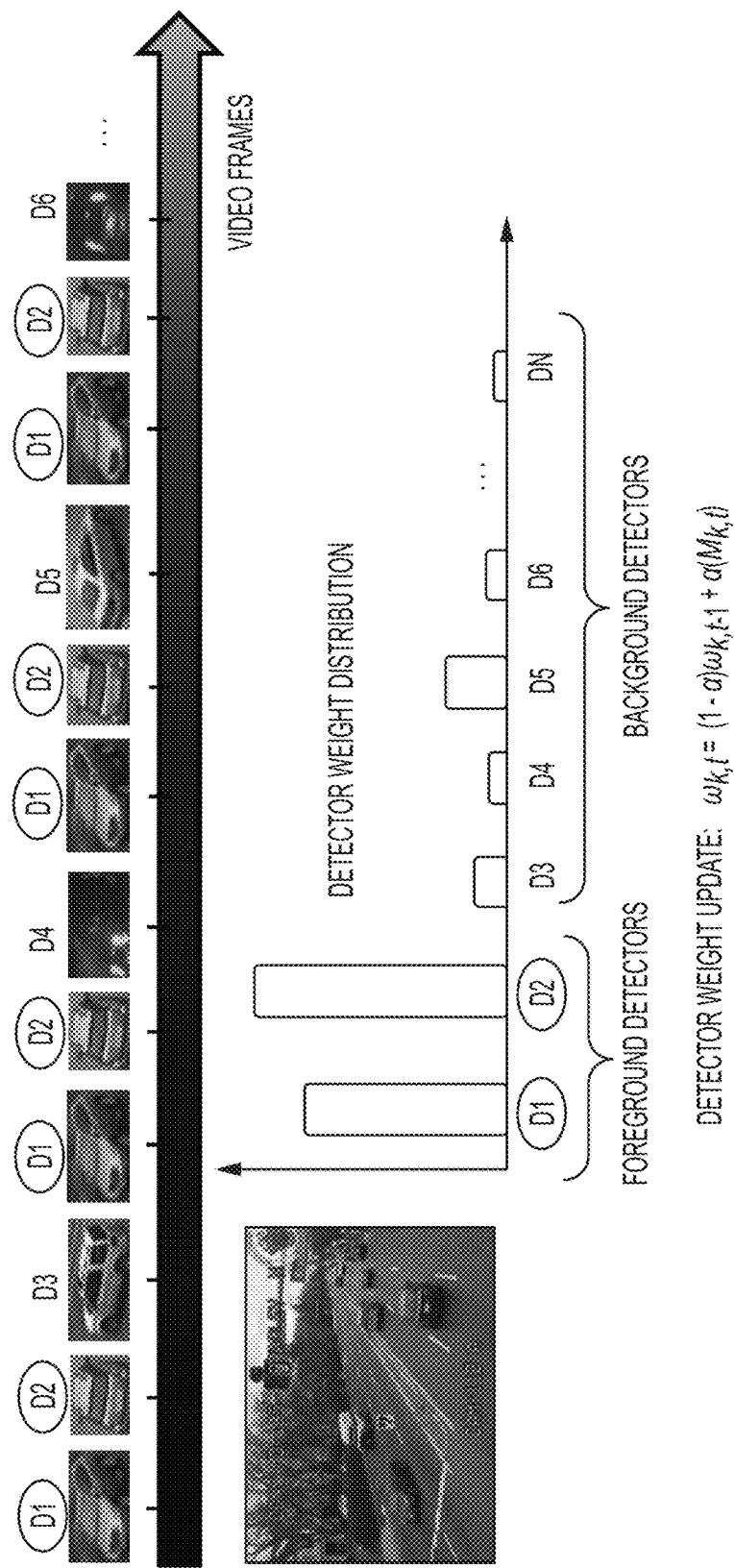
FIG. 6 depicts a diagram further illustrating operation of a detector selection and adaption module according to one or more embodiments.

When a detector fires, the weight distribution is updated according to a Detector Weight Update equation shown in FIG. 6, wherein $M_{k,t}$ is one (1) for the detector that fired and zero (0) for all others, and $\alpha = C_k \theta$ is the product of the detector confidence score $C_k$ and the learning rate $\theta$, which determines the speed at which the distribution's parameters change. In one or more embodiments, $\theta = 0.001$. After this approximation, the weights are renormalized. $W_{k,t}$ is effectively a causal low-pass filtered average of the thresholded firing probability of detector k from time 1 through t. This is equivalent to the expectation of this value with an exponential window on the past values.

At any given time t, all detectors $D_k$ with associated weight $w_{k,t} > T$, where T is a threshold, are classified as foreground detectors and the remaining ones are classified as background detectors. Generally only a few detectors are selected as foreground at a given time period. Each image frame may correspond to each full image frame or it may correspond to a subset region of a full image frame.

Figure 5:
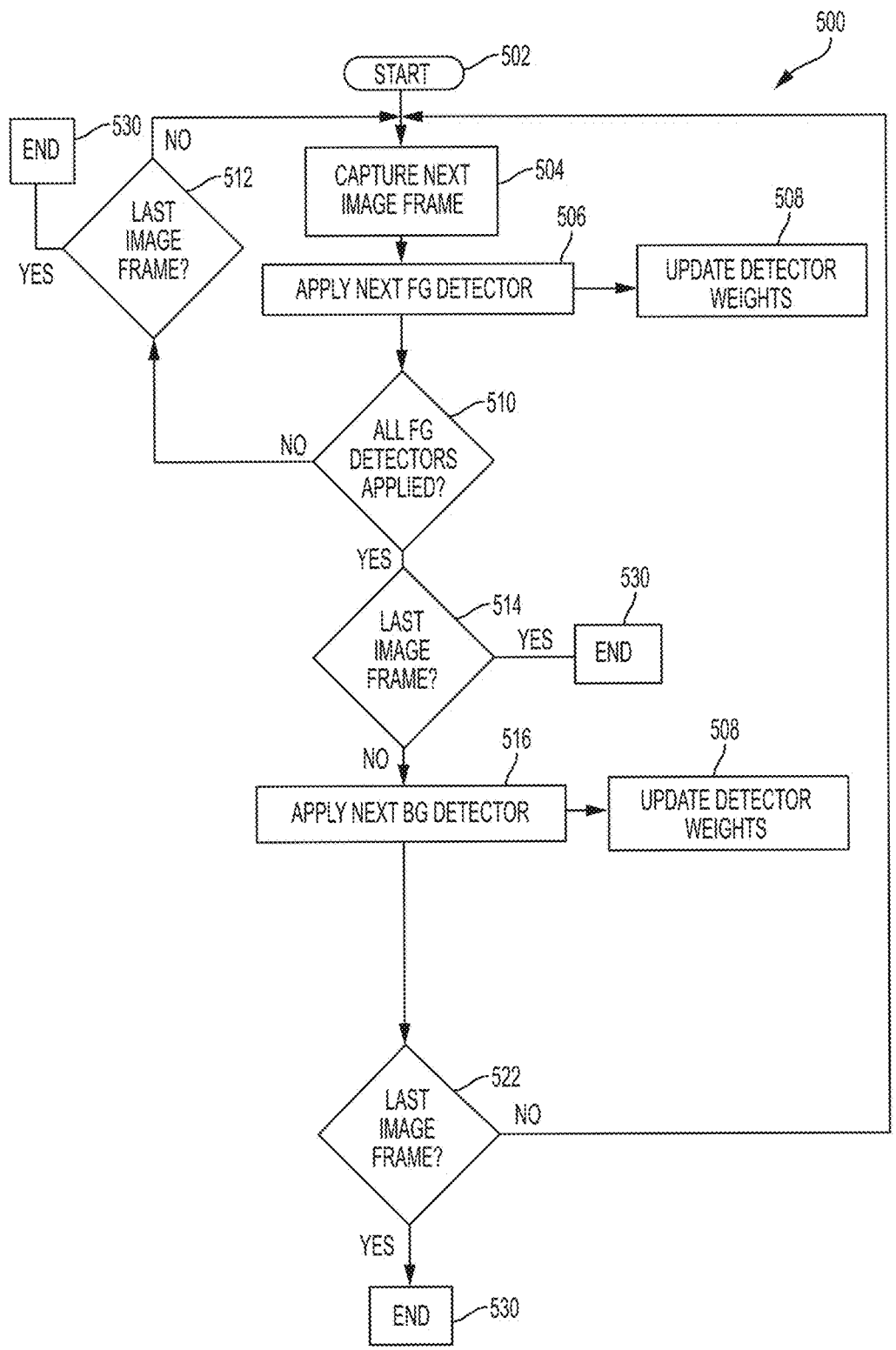
FIG. 5 depicts a methodology performed by the detector selection and adaption module shown in FIGS. 2 and 4 according to one or more embodiments.

FIG. 5 depicts a methodology 500 that may be performed by DSA modules 202, 202A shown in FIGS. 2 and 4, respectively, according to one or more embodiments. Methodology 500 starts at block 502 then moves to block 504 to capture the next image frame. Block 506 applies the next foreground (FG) detector, which on a first iteration of methodology 500 is the first foreground detector, to the captured image frame. Block 508 updates the detector weights (i.e., confidence score) based at least in part on whether or not the detector fired (i.e., detected the predetermined object) and, if the detector fired, the confidence level of the detector's determination that the predetermined object is present in the image frame. Whenever a detector is applied (irrespective of being FG or BG), all detector weights are updated so they conform with a probability distribution. For example, if one detector fires, its weight will become larger and the others' weights will become smaller. The assumption is that only a few detectors are appropriated for a given scenario, accordingly their probability will be higher than others (i.e., the sum of weights equals one). Decision block 510 determines whether or not all foreground (FG) detectors have been applied. If the answer to the inquiry at decision block 510 is no, methodology 500 moves to decision block 512 to determine whether or not the last image frame has been captured. If the answer to the inquiry at decision block 512 is yes, methodology 500 moves to block 530 and ends. If the answer to the inquiry at decision block 512 is no, methodology 500 returns to block 504 and captures the next image frame. If the answer to the inquiry at decision block 510 is yes, methodology 500 moves to block decision block 514 to determine whether or not the last image frame has been captured. If the answer to the inquiry at decision block 514 is yes, methodology 500 moves to block 530 and ends. If the answer to the inquiry at decision block 514 is no, methodology 500 moves to block 516.

Block 516 applies the next background (BG) detector to the captured image frame. Block 518 updates the detector weights (i.e., confidence score) based at least in part on whether or not the detector fired (i.e., detected the predetermined object) and, if the detector fired, the confidence level of the detector's determination that the predetermined object is present. Block 522 adjusts the distribution of the foreground and background detectors based at least in part on the updated weights determined at blocks 508 and 518. According to the present disclosure, detectors are classified as foreground or background based at least in part on the detector's weight (i.e., confidence score), which is based at least in part whether or not the detector fires (i.e., detects an image), and, if the detector fires, the confidence level of the detector's determination the predetermined object is present in the image frame. If a detector's weight is above a predetermined level, it is classified as foreground, and if a detector's weight is below a predetermined level, it is classified as a background detector. Accordingly, the updates performed at blocks 508, 518 can reclassify a foreground detector as a background detector if the foreground detector's updated weight falls below a predetermined threshold, and can reclassify a background detector as a foreground detector if the background detector's updated weight exceeds a predetermined threshold. Methodology 500 moves to decision block 522 to determine whether or not the last image frame has been captured. If the answer to the inquiry at decision block 522 is yes, methodology 500 moves to block 530 and ends. If the answer to the inquiry at decision block 522 is no, methodology 500 returns to block 504 and captures the next image frame.

Figure 7:
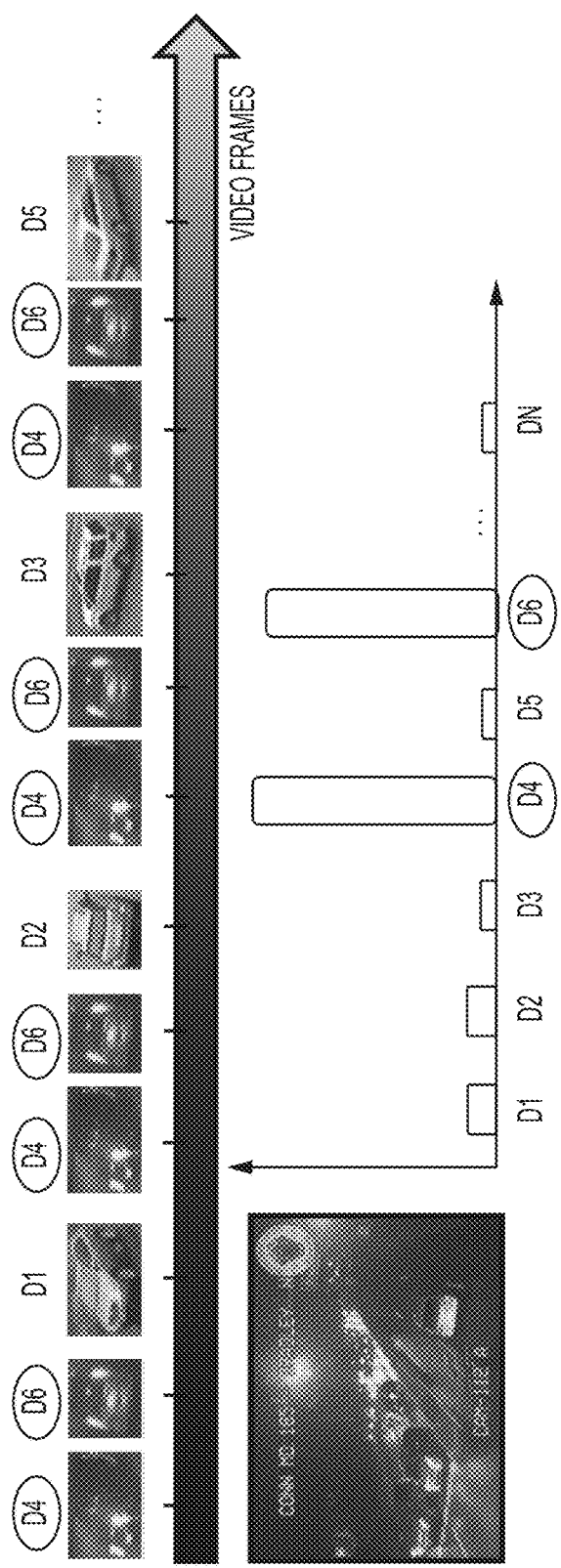
FIG. 7 depicts a diagram further illustrating operation of a detector selection and adaption module according to one or more embodiments.

FIGS. 6 and 7 depict diagrams of examples further illustrating operation of DSA modules 202, 202A shown in FIGS. 2 and 4, respectively, according to one or more embodiments. The examples shown in FIGS. 6 and 7 illustrate how to use system 200, 200A (shown in FIGS. 2 and 4, respectively) for efficient object detection in surveillance videos. In one or more embodiments, the application domain does not require a detector to fire at every single frame, as a tracking module (not shown) may be provided to fill-in the missed detections. However, the detections need to be sufficiently dense to enable more effective tracking and minimize false negatives. To increase efficiency, detectors are selected and applied according to the following pattern. Foreground detectors are interleaved across the video sequence, running a single detector per image frame or location. Once the end of the list of foreground detectors is reached, the next subsequent frame is used to run a background detector, which is selected from the list of background detectors in a round-robin fashion. The foreground detectors are applied again, and the pattern is repeated. The detector weight distribution is updated every time a detector fires as described previously herein, allowing background detectors to re-emerge as foreground detectors at a later time.

In addition to adapting to different cameras and environmental conditions, the present disclosure is also suitable to accommodate the common scenario of a security guard user moving a camera to monitor another static scene. In such a scenario, after the camera movement, new detectors may be automatically selected as foreground to adapt to the new object poses and scene appearance.

Thus, it can be seen from the foregoing description and illustration that one or more embodiments of the present disclosure provide technical features and benefits. The disclosed object detection systems and methodologies reliably and continuously detect objects in a continuous surveillance video system (e.g., IVA) across significantly varying conditions, such as weather conditions and time of day. Rather than training a generic detector and attempting to adapt its parameters to a wide range of conditions, which is computationally expensive and sensitive to drifting, the present disclosure instead creates a set of efficient detector models that cover multiple and potentially overlapping appearance subspaces. At run time, one or more embodiments continuously select the most suitable detectors for a given scene and environmental condition(s). The suitability of a detector is measured or weighted based at least in part on an evaluation of each detector's calibrated confidence score, which is updated over time. The present disclosure classifies each detector as a foreground detector or a background detector based at least in part on each detector's confidence score being above or below a predetermined threshold. Foreground detectors, which have been determined by their confidence scores to be suitable to the current environmental condition(s), are run frequently across the video sequence. Background detectors, which have been determined by their confidence scores to not be suitable to the current environment condition(s), are run sporadically across the video sequence.

Because confidence scores are updated over time, and because both foreground and background detectors are continuously applied, the present disclosure re-classifies a given background detector as a foreground detector if the given background detector's updated confidence score exceeds the predetermined threshold. Likewise, the present disclosure re-classifies a given foreground detector as a background detector if the given foreground detector's updated confidence score falls below the predetermined threshold. Accordingly, the present disclosure dynamically selects and applies the detector(s) most appropriate for a given scene and environmental condition(s).

Figure 8:
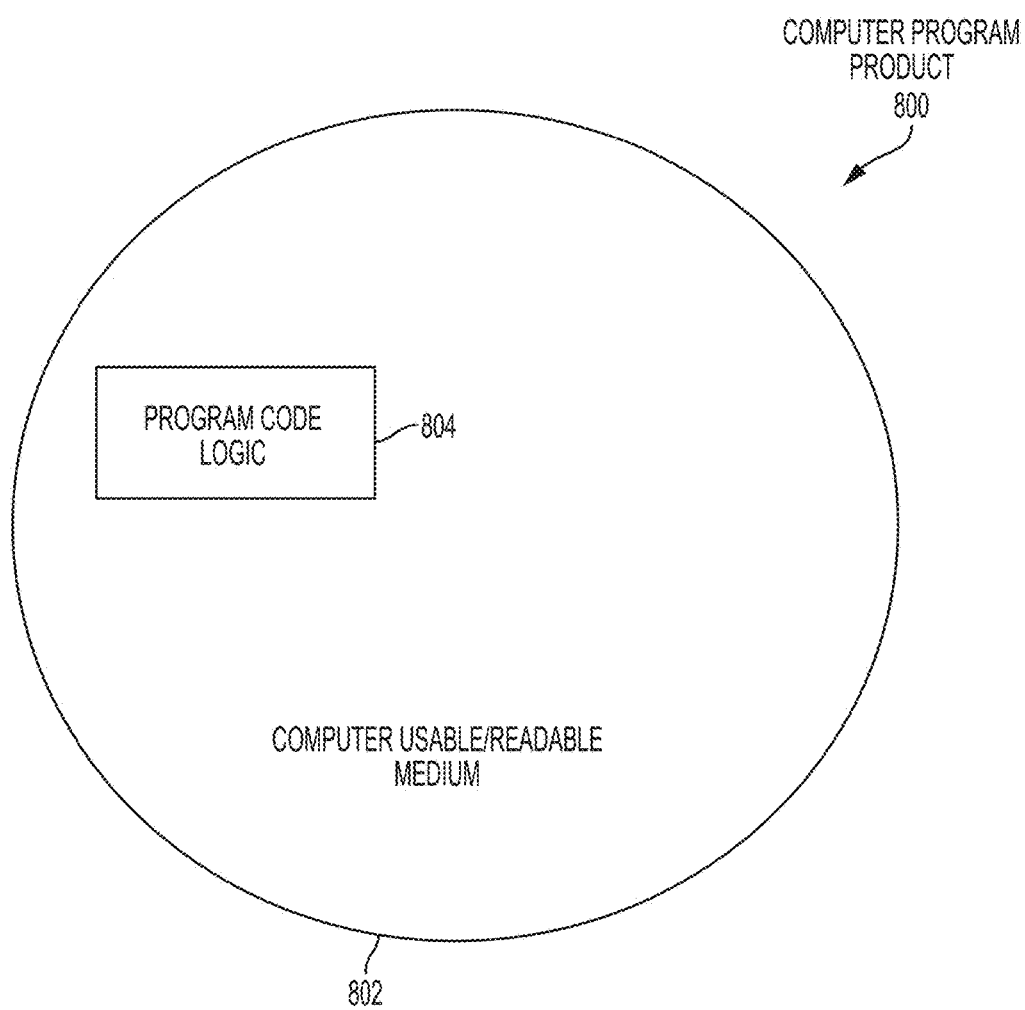
FIG. 8 depicts a computer program product in accordance with one or more embodiments.

Referring now to FIG. 8, a computer program product 800 in accordance with an embodiment that includes a computer readable storage medium 802 and program instructions 804 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It will be understood that those skilled in the art, both now and in the future, may make various improvements and enhancements which fall within the scope of the claims which follow.

What is claimed is:

1. In an object detection system having at least one processor circuit configured to receive a series of image regions and apply to each image region in the series a detector, the detector configured to determine a presence of a predetermined object in the image region, a computer implemented method of selecting and applying the detector, the method comprising:
   selecting and applying, by the at least one processor circuit, the detector from among a plurality of foreground detectors and a plurality of background detectors in a repeated pattern comprising:
   sequentially selecting, by the at least one processor circuit, a selected one of the plurality of foreground detectors;
   sequentially applying, by the at least one processor circuit, the selected one of the plurality of foreground detectors to one of the series of image regions until all of the plurality of foreground detectors have been applied;
   selecting, by the at least one processor circuit, a selected one of the plurality of background detectors; and
   applying, by the at least one processor circuit, the selected one of the plurality of background detectors to one of the series of image regions.

2. An object detection system, comprising:
   at least one processor circuit configured to receive a series of image regions and apply to each image region in the series a detector, the detector configured to determine a presence of a predetermined object in the image region;
   the at least one processor circuit configured to select and apply the detector from among a plurality of foreground detectors and a plurality of background detectors in a repeated pattern comprising:
   a sequential selection of a selected one of the plurality of foreground detectors;
   a sequential application of the selected one of the plurality of foreground detectors to one of the series of image regions until all of the plurality of foreground detectors have been applied;
   selection of a selected one of the plurality of background detectors; and
   application of the selected one of the plurality of background detectors to one of the series of image regions.

3. The system of claim 2, wherein in each iteration of the repeated pattern, the selected one of the plurality of background detectors is different from the selected one of the plurality of background detectors of an immediately preceding iteration of the repeated pattern.

4. The system of claim 2, wherein each one of the plurality of foreground detectors and each of one of the plurality of background detectors is configured to detect the presence of the predetermined object under a unique set of environmental conditions.

5. The system of claim 2, wherein:
   each one of the plurality of foreground detectors comprises a foreground detector weight that is above a predetermined threshold; and
   each one of the plurality of background detectors comprises a background detector weight that is below the predetermined threshold.

6. The system of claim 5 further, wherein the at least one processor circuit is further configured to:
   after applying the selected one of the plurality of foreground detectors to one of the series of image regions, generate an updated foreground detector weight;
   after applying one of the plurality of weighted background detectors to one of the series of images, generate an updated background detector weight;
   move to the plurality of foreground detectors each background detector having an updated background detector weight that exceeds the predetermined threshold; and
   move to the plurality of background detectors each foreground detector having an updated foreground detector weight that is below the predetermined threshold.

7. A computer program product controlling an objection detection system having at least one processor circuit configured to receive a series of image regions and apply to each image region in the series a detector, the detector configured to determine a presence of a predetermined object in the image region, the computer program product comprising:
   a computer readable storage medium having program instructions embodied therewith, wherein the computer readable storage medium is not a transitory signal per se, the program instructions readable by the at least one processor circuit to cause the at least one processor circuit to perform a method comprising:
   selecting and applying the detector from among a plurality of foreground detectors and a plurality of background detectors in a repeated pattern comprising:
   sequentially selecting a selected one of the plurality of foreground detectors;
   sequentially applying the selected one of the plurality of foreground detectors to one of the series of image regions until all of the plurality of foreground detectors have been applied;
   selecting a selected one of the plurality of background detectors; and
   applying the selected one of the plurality of background detectors to one of the series of image regions.

8. The computer program product of claim 7, wherein in each iteration of the repeated pattern, the selected one of the plurality of background detectors is different from the selected one of the plurality of background detectors of an immediately preceding iteration of the repeated pattern.

9. The computer program product of claim 7, wherein each one of the plurality of foreground detectors and each of one of the plurality of background detectors is configured to detect the presence of the predetermined object under a unique set of environmental conditions.

10. The computer program product of claim 7, wherein:
    each one of the plurality of foreground detectors comprises a foreground detector weight that is above a predetermined threshold; and
    each one of the plurality of background detectors comprises a background detector weight that is below the predetermined threshold.

11. The computer program product of claim 10, wherein the at least one processor circuit is further configured to:
    after applying the selected one of the plurality of foreground detectors to one of the series of image regions, generate an updated foreground detector weight;

after applying one of the plurality of weighted background detectors to one of the series of images, generate an updated background detector weight;
move to the plurality of foreground detectors each background detector having an updated background detector weight that exceeds the predetermined threshold; and
move to the plurality of background detectors each foreground detector having an updated foreground detector weight that is below the predetermined threshold.

* * * * *